(12) United States Patent
Bennett et al.

(10) Patent No.: US 7,627,398 B1
(45) Date of Patent: Dec. 1, 2009

(54) APPARATUS PROVIDING POWER-OVER-ETHERNET TEST INSTRUMENT

(75) Inventors: Kendrick R. Bennett, Tewksbury, MA (US); John H. Cafarella, Swampscott, MA (US); Peter G. Johnson, Andover, MA (US)

(73) Assignee: Sifos Technologies, Inc., Tewksbury, MA (US)

( * ) Notice: Subject to any disclaimer, the term of this patent is extended or adjusted under 35 U.S.C. 154(b) by 492 days.

(21) Appl. No.: 11/355,783

(22) Filed: Feb. 16, 2006

Related U.S. Application Data

(60) Provisional application No. 60/653,814, filed on Feb. 17, 2005.

(51) Int. Cl.
*G05D 3/12* (2006.01)
*G06F 1/00* (2006.01)
*G06F 1/26* (2006.01)
*G06F 1/32* (2006.01)

(52) U.S. Cl. .................. 700/286; 700/295; 700/297; 713/300; 713/310; 713/320; 713/330

(58) Field of Classification Search .................. None
See application file for complete search history.

(56) References Cited

U.S. PATENT DOCUMENTS

| | | | |
|---|---|---|---|
| 6,584,418 B2 * | 6/2003 | Murphy et al. ............... 702/60 |
| 6,715,087 B1 * | 3/2004 | Vergnaud et al. ............ 713/300 |
| 7,162,377 B2 * | 1/2007 | Amrod et al. ................. 702/60 |
| 7,356,588 B2 * | 4/2008 | Stineman et al. ............ 709/224 |
| 7,366,297 B1 * | 4/2008 | Marshall et al. ......... 379/413.03 |
| 7,549,067 B2 * | 6/2009 | Tolliver ..................... 370/389 |
| 2003/0099076 A1 * | 5/2003 | Elkayam et al. ............... 361/90 |
| 2005/0135258 A1 * | 6/2005 | Amrod et al. ................ 370/241 |
| 2005/0197094 A1 * | 9/2005 | Darshan et al. ............. 455/402 |
| 2006/0078093 A1 * | 4/2006 | Karam et al. .................. 379/24 |

* cited by examiner

*Primary Examiner*—Ramesh B Patel
*Assistant Examiner*—Sunray R Chang
(74) *Attorney, Agent, or Firm*—Chapin IP Law, LLC

(57) ABSTRACT

An apparatus for measuring characteristics of a at least one Power Over Ethernet (PoE) Power Sourcing Equipment (PSE) device (also referred to as a PSE test blade) is presented. The apparatus includes a port controller and a current loading circuit in communication with the port controller. The apparatus further includes a resistance loading circuit in communication with the port controller, a capacitance loading circuit in communication with the port controller, and a load current and voltage measuring circuit in communication with the port controller. The apparatus further includes a first network providing the power signals to at least one of the current loading circuit, the resistance loading circuit, the capacitance loading circuit, and the load current and voltage measuring circuit. The port controller utilizes a set of test primitives which are accessed in real time via a user interface to execute test sequences for characterizing PSE devices.

18 Claims, 10 Drawing Sheets

APPARATUS PROVIDING POWER-OVER-ETHERNET TEST INSTRUMENT

CROSS REFERENCE TO RELATED APPLICATIONS

The present application claims the benefit of U.S. Provisional Patent Application No. 60/653,814 filed on Feb. 17, 2005, which is incorporated herein by reference.

BACKGROUND

A typical Power over Ethernet (PoE) power communications system includes power-sourcing equipment (PSE) and a set of remotely-powered network devices (e.g., PDs or Powered Devices) that connect to the power-sourcing equipment through network cables. Power-sourcing equipment can include i) power supply circuitry to provide power through a cable to a respective network device and ii) transmit/receive circuitry to support data communications with a respective network device at the other end of a cable. Accordingly, when supplied power through the cable, a user of the respective network device is not burdened with having to separately connect his network devices to another power source such as a 115 volt wall outlet. Instead, the network device coupled to a port of the power-sourcing communications equipment relies on power received through the cable.

There are industry standards which attempt to provide guidelines for manufacturing certain types of power-sourcing communications equipment. For example, the IEEE 802.3af standard, which is also called the "Power over Ethernet" standard, defines ways to build Ethernet power-sourcing equipment and powered devices. In particular, the IEEE 802.3af standard identifies ways to deliver certain electrical features (e.g., 48 volts) of DC power over unshielded twisted-pair wiring (e.g., Category 3, 5, 5e or 6 network cables, patch cables, patch-panels, outlets and connecting hardware) to a variety of Ethernet devices such as IP phones, wireless LAN access points, laptop computers, web cameras, and the like.

In the context of the IEEE 802.3 Ethernet Standard, which does not cover UPS applications and is limited to PSE and PD interactions, the power-sourcing equipment discussed above is referred to a Power Sourcing Equipment (PSE) and network devices coupling to the PSE (e.g., a switch device) through cables are known as Powered Devices (PDs).

Power-over-Ethernet offers benefits in simplifying deployment of small data devices because remote power supplies are eliminated. Power-Sourcing Equipment may be Endpoint, when integrated into an Ethernet switch, or Midspan, when inserted between a non-PoE Ethernet switch and a PD. A PSE may employ Alternative A, wherein power is conveyed over pairs 1 and 4, or Alternative B, wherein power is conveyed over pairs 2 and 3. Endpoint PSEs using Alternative A may use Normal or Inverted polarity. PoE devices may conform to the IEEE 802.3af standard, may be proprietary, or may be compatible with the standard but still operate with proprietary devices. The various PSE configurations require a test instrument with considerable flexibility in wiring configurations.

Because testing of PoE-enabled Ethernet switches should include both data testing and PSE testing, one capability is the inclusion of data and PSE testing in a single instrument. Such a device could be realized by combining the PoE instrumentation concepts herein with well-known data-testing techniques. However, because of the very large installed base of data-testing instrumentation, an attractive capability is presented by realization of a PSE tester which can be transparently inserted between an Ethernet switch and a data-only tester. A stand-alone PSE test capability would enable existing data-testing suites to be upgraded for PSE testing. Notwithstanding this, the techniques described herein for a stand-alone PSE-testing capability are further applicable to make an integrated PSE-testing/data-testing instrument.

An instrument useful for parametric production testing as well as laboratory design verification and characterization should support a wide variety of tests, provide high accuracy measurements, and enable a wide range of parameter variations. In addition, such an instrument should be easily interfaced to computers for control and analysis of data, readily incorporated into test configurations with other equipment, and provide a rich set of primitives to support a flexible scripting language and/or GUI interface.

SUMMARY

Conventional mechanisms such as those explained above suffer from a variety of deficiencies. One such deficiency is that conventional PSE test systems include a hard-coded set of test primitives. As such, in the event that different test primitives are needed, or if existing test primitives need to change or be supplemented, the test system requires reprogramming or replacement.

Embodiments of the invention significantly overcome such deficiencies and present mechanisms and techniques that make available an apparatus providing a POE test instrument which includes a port controller, a current loading circuit in communication with the port controller, a resistance loading circuit in communication with the port controller, a capacitance loading circuit in communication with the port controller, a load current and voltage measuring circuit in communication with the port controller; and a network connection capable of receiving power signals from a network and providing the power signals to at least one of the current loading circuit, the resistance loading circuit, the capacitance loading circuit, and the load current and voltage measuring circuit and wherein the port controller utilizes a set of test primitives which are accessed in real time via a user interface to execute test sequences for characterizing PSE devices.

Instrumentation for many applications has evolved to systems of rack-mounted instrumentation wherein "blades" or "cards" plugged into the rack provide various required functions. A PSE-testing blade can be configured to support testing of a single PSE or multiple PSEs. For greatest flexibility, and to localize high-speed interactions, each blade would have controllers which directly interact with circuitry on that blade for each test port. A rack could contain a backplane into which blades are installed, with a chassis controller to control the ports, as well as to interface to equipment external to the rack. The chassis controller could accept commands from the external computer, possibly translate between a format presented by the external computer and the command set used on the blade, then perform the required interaction with each port controller. The chassis controller would also have dedicated lines to/from each port which enable triggering, and also dedicated hardware lines to support triggering to/from external equipment.

An important aspect of this architecture is the possibility to operate all ports simultaneously, thus offering very high throughput for bulk PSE testing. Each port carries out the assigned test under control of the port controller, often requiring high-speed interactions with measurement circuitry. The chassis controller returns to each port to recover the results of the measurement.

In a particular embodiment of an apparatus for measuring characteristics of a at least one Power Over Ethernet (PoE) Power Sourcing Equipment (PSE) device (also referred to as a PSE test blade), the apparatus comprises a port controller and a current loading circuit in communication with the port controller. The apparatus further includes a resistance loading circuit in communication with the port controller, a capacitance loading circuit in communication with the port controller, and a load current and voltage measuring circuit in communication with the port controller. The apparatus further includes a first network connection capable of receiving power signals from a network and providing the power signals to at least one of the current loading circuit, the resistance loading circuit, the capacitance loading circuit, and the load current and voltage measuring circuit and wherein the port controller utilizes a set of test primitives which are accessed in real time via a user interface to execute test sequences for characterizing PSE devices. A test primitive is defined as a testing resource that is configured by a remotely generated command and in certain cases generates a status and/or a measurement result in response to remotely generated commands. Primitives consist of both hardware and firmware components resident in each test port.

In another particular embodiment of a system for measuring characteristics of at least one Power Over Ethernet (PoE) Power Sourcing Equipment (PSE) device the system includes a chassis controller and at least one POE PSE test and measurement device in communication with the chassis controller. Each of the POE PSE test and measurement devices comprises a port controller and a current loading circuit in communication with the port controller. The test and measurement devices further includes a resistance loading circuit in communication with the port controller, a capacitance loading circuit in communication with the port controller, and a load current and voltage measuring circuit in communication with the port controller. The test and measurement devices also includes a first network connection capable of receiving power signals from a network and providing the power signals to at least one of the current loading circuit, the resistance loading circuit, the capacitance loading circuit, and the load current and voltage measuring circuit. The port controller utilizes a set of test primitives which are accessed in real time via a user interface to execute test sequences for characterizing PSE devices. The system may be inserted between a device such as an Ethernet switch and a data tester or may be combined with the data tester.

BRIEF DESCRIPTION OF THE DRAWINGS

The foregoing will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIGS. 2A and 2B depict the modular rack/blade construction, both mechanical and logical perspectives;

DETAILED DESCRIPTION

Power-over-Ethernet (PoE) offers tremendous benefit in simplifying deployment of small data devices because remote power supplies are eliminated. Examples of Powered Devices (PD), that is, devices receiving both data and power over Cat-5 wiring, are Voice-over-IP telephones and wireless LAN access points. Power-Sourcing Equipment (PSE) may be Endpoint, when integrated into an Ethernet switch, or Midspan, when inserted between a non-PoE Ethernet switch and a PD. In addition, a PSE may employ Alternative A (AltA), wherein power is conveyed over pairs 1 and 4, or Alternative B (AltB), wherein power is conveyed over pairs 2 and 3. Endpoint PSEs using Alternative A may use Normal or Inverted polarity. PoE devices may conform to the IEEE 802.3af standard, may be proprietary, or may be compatible with the standard but still operate with proprietary devices. The various PSE configurations require a test instrument with considerable flexibility in wiring configurations.

The testing of power-sourcing equipment requires a combination of flexibility and accuracy, but as well requires a cost-effective solution if used for production testing in addition to laboratory use. The technology described herein provides low-cost, accurate measurements, emulation of Power-over-Ethernet protocols, and flexible implementation of measurements via software control of basic hardware measurement capabilities. In addition, issues such as modularity and power dissipation are accommodated.

Figure 1A:
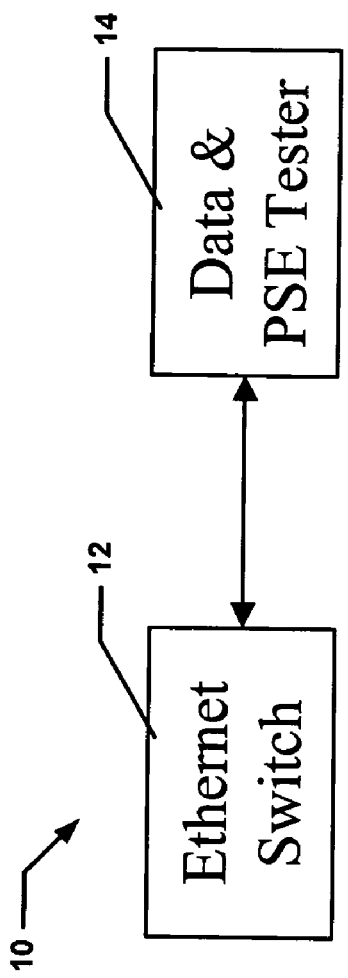
FIG. 1A shows a test configuration integrating a PSE testing device and a data tester into a single instrument.
Figure 1B:
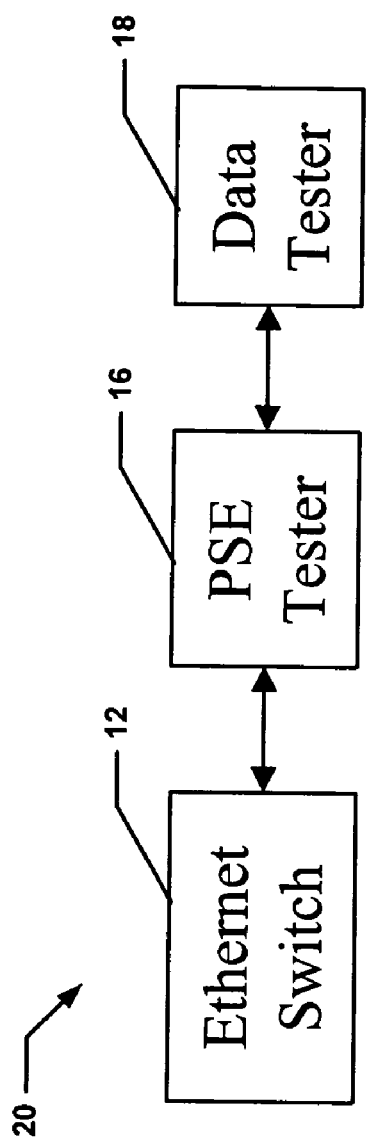

Referring now to FIGS. 1A and 1B, because testing of PoE-enabled Ethernet switches should include both data testing and PSE testing, a natural capability would be inclusion of data and PSE testing in a single instrument as shown in FIG. 1A. In this environment 10, a device such as an Ethernet switch 12 is shown in communication with a combination data and PSE tester 14. The Data and PSE Tester 14 could be realized by combining the PoE instrumentation concepts herein with well-known data-testing techniques. However, because of the very large installed base of data-testing instrumentation, an attractive capability is shown in FIG. 1B. In this test environment 20, a PSE tester 16 is transparently inserted between a device such as an Ethernet switch 12 and a data-only tester 18. A stand-alone PSE test capability enables existing data-testing suites to be upgraded for PSE testing. Notwithstanding this, the techniques described herein for a stand-alone PSE-testing capability are readily applicable by one of reasonable skill in the art to make an integrated PSE-testing/data-testing instrument.

Some testing of PSEs might employ a simple PD emulator, that is, a device which behaves nominally like a PD, with perhaps some modest parameter variations, but sufficient for go-no-go type testing. However, a true instrument, useful for parametric production testing as well as laboratory design verification and characterization, supports a wide variety of tests, provides high accuracy measurements, and enables a wide range of parameter variations. In addition, such an instrument should be easily interfaced to computers for control and analysis of data, readily incorporated into test configurations with other equipment, and provide a rich set of primitives to support a flexible scripting language and/or GUI interface. Of course, such a comprehensive testing capability could also perform PD emulation.

Figure 2A:
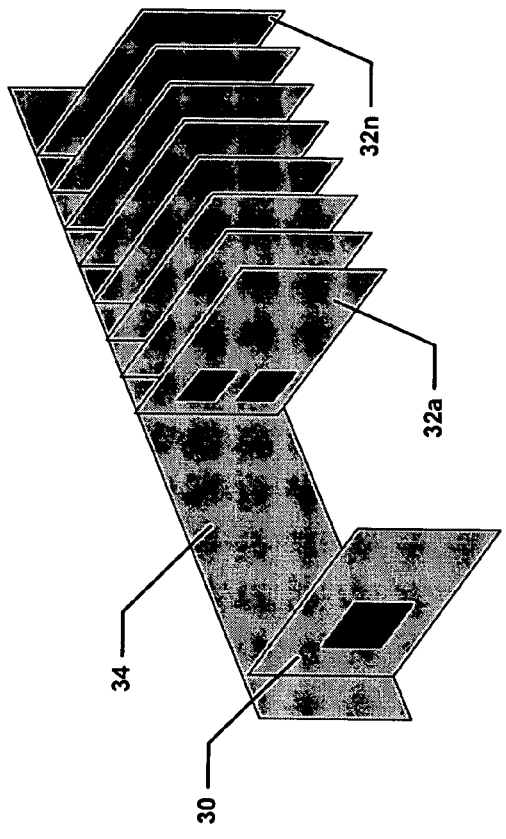
FIG. 2A shows a configuration wherein a PSE testing device is added to an existing data-testing configuration.
Figure 2B:
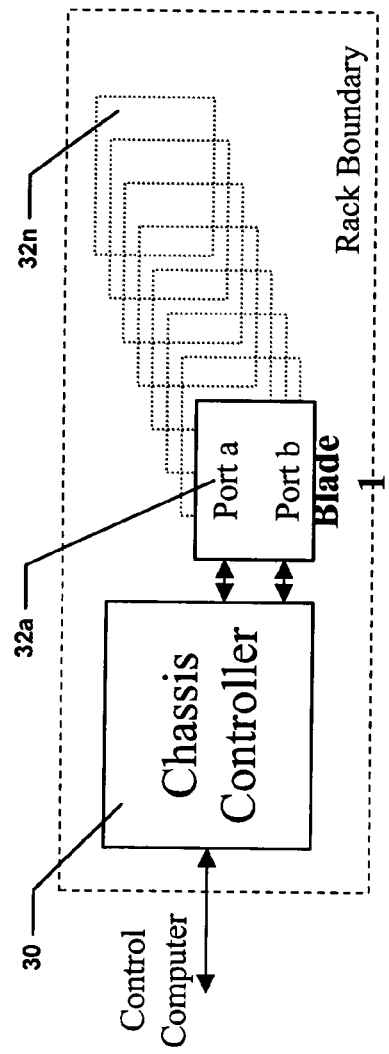

Referring now to FIGS. 2A and 2B, instrumentation for many applications has evolved to systems of rack-mounted instrumentation wherein "blades" or "cards" are plugged into the rack to provide various required functions. An example is shown in FIG. 2A wherein a backplane 34 is used to provide communication between a first blade 30 and other blades 32a-32n. As shown in FIG. 2A, in a particular embodiment. a first blade comprises a chassis controller 30 which communicates with a plurality of PSE-testing blades 32a-32n.

A particular embodiment of an apparatus for measuring characteristics of a at least one Power Over Ethernet (PoE) Power Sourcing Equipment (PSE) (also referred to as a PSE-testing blade) 32 can be configured to support testing of a single PSE, or alternately for simultaneous testing of two or more such PSEs, each referred to as a port (e.g., port a and port b as shown in FIG. 2B). This blade may be installed in a rack which holds blades for other test functions, or a rack may be maximally populated with PSE-testing blades for bulk PSE testing. For greatest flexibility, and to localize high-speed interactions, each port includes a controller which directly interacts with circuitry for that port. A rack may contain a back plane 34 into which blades 32a-32n are inserted as shown in FIG. 2A, with a chassis controller 30 to control all ports, as well as to interface to equipment external to the rack as shown in FIG. 2B. For example, control of the rack could be effected, as examples, via an Ethernet connection over a LAN or by an RS-232 interface, using a remote computer. The chassis controller 30 can accept commands from external computers, possibly translate between a format presented by the external computer and the command set used on the blades, then perform the required interaction with the port controllers on the PSE test blades 32a-32n. The chassis controller 30 may also have dedicated lines to/from each port controller which enable triggering, and also dedicated hardware lines to support triggering to/from external equipment. A feature of this architecture not available in conventional POE test systems is that test primitives are defined by firmware in the port controllers causing local behavior of the test circuitry, but that overall PSE test sequences are defined by software running on the remote computers. This enables programmers to continually expand and evolve test sequences for various purposes without requiring changes to the PSE tester hardware or firmware.

An important aspect of this architecture is the possibility to operate all ports simultaneously, thus offering very high throughput for bulk PSE testing. In this context, the chassis controller 30 can start a port running a test primitive which might take some time, then move on to assign tasks to other ports. Each port test circuit carries out the assigned test primitive under control of the port controller, often requiring high-speed interactions with measurement circuitry. The chassis controller returns to each port to recover the results of the measurement.

Figure 3:
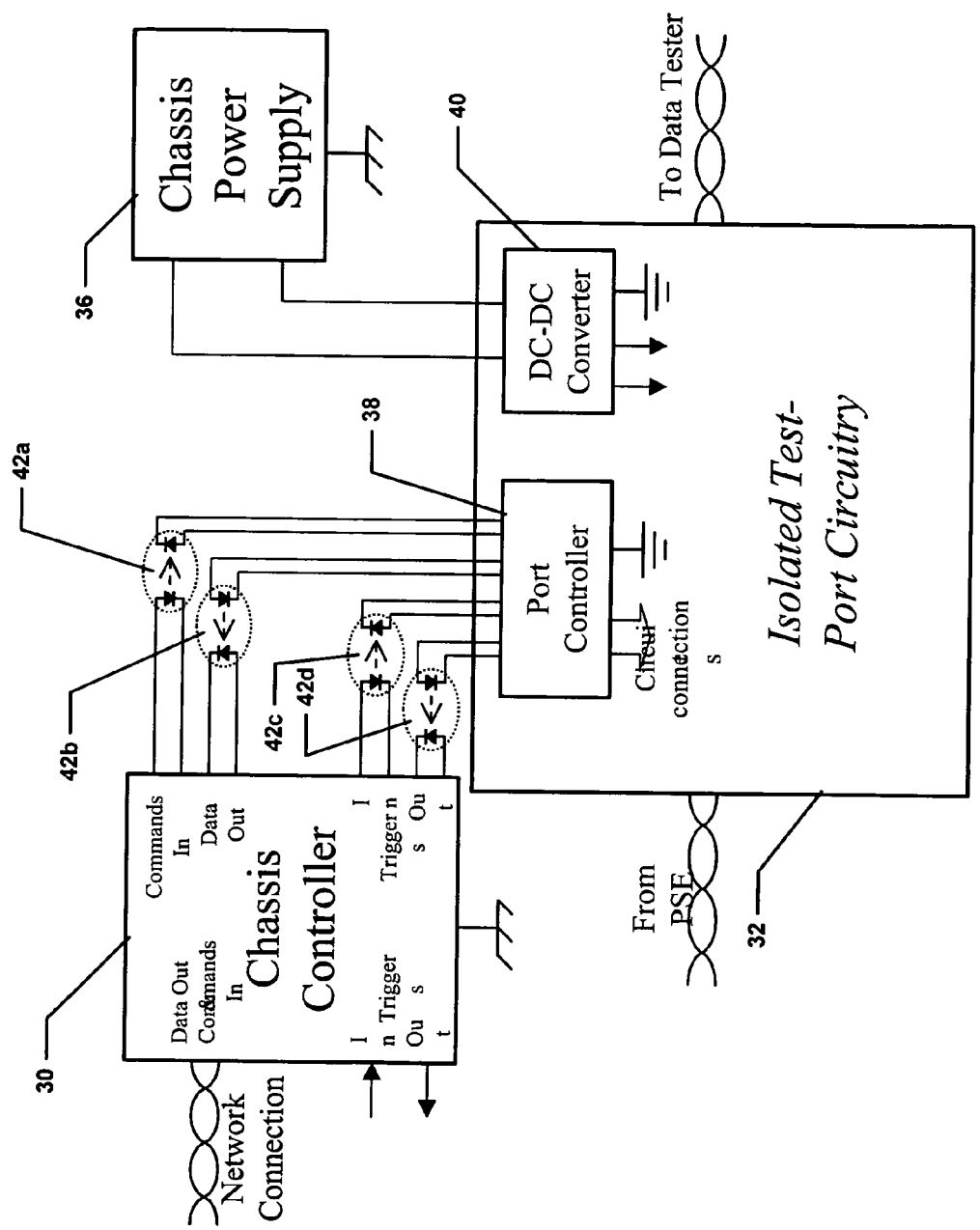
FIG. 3 shows port DC isolation achieved by supplying DC power via a DC-to-DC converter and by using opto-isolators on digital control lines.

Referring now to FIG. 3, for fault tolerance, particularly against wiring short circuits in factory environments where voltages can be high, Ethernet data links over Cat-5 wiring have DC isolation transformers at both ends. Consequently, PoE equipment is designed using DC-to-DC converters 40 to effect DC isolation from a chassis power supply 36 consistent with Ethernet requirements. To ensure compatibility with any valid Ethernet test configuration, PoE test ports may also be DC isolated from the chassis and other ports as shown in FIG. 3. Using a DC-to-DC converter 40 for each port requires converters of minimal capacity and lowest cost, and ensures isolation of power supplies on all ports. This, in turn, requires that the interface lines between the chassis controller and the port controller also have DC isolation, which can be effected using opto-isolators 42a-42d. If the number of control lines per port is minimized, then there is little cost increase for DC opto-isolation of the control lines. For example, in a particular embodiment, a minimal, but effective, interface may include four simplex links. Using a bit-serial representation of words, one line would convey commands from the chassis controller to the port controller, and another line would convey data or responses from the port controller to the chassis controller. Another pair of lines would convey simple synchronization pulses into or out of the port.

PoE testing presents a unique requirement for heat dissipation due to the manner in which current/voltage behavior is specified. The maximum power of 15.4 W is specified at the maximum PD load current of 350 mA, which requires 44V at the PD; to accommodate voltage drop over the Cat-5 cable as well as internal PSE drop with load current, the voltage presented to the PD by the PSE at 350 mA load current is within specification for the range 44V to 57V. Furthermore, to exercise turn-on transients and short circuits, current loads of up to 450 mA may be required. Thus, a current load for a PSE test instrument might be designed to sink as much as 500 mA, and should do this indefinitely with 60V input voltage, which results in 30 W power dissipation. The potential heat load in a chassis having, for example, two PSE ports per blade with ten blades in the chassis could be 600 W. Configurations with more ports per blade, more blades per chassis, or future PoE evolution to higher power capabilities can readily double or quadruple the power which must be dissipated in the chassis. Getting heat out of components and also out of the PSE-instrument chassis is critical, and most laboratory instruments exploit ventilation techniques which can't possibly handle such high heat loads.

Figure 4:
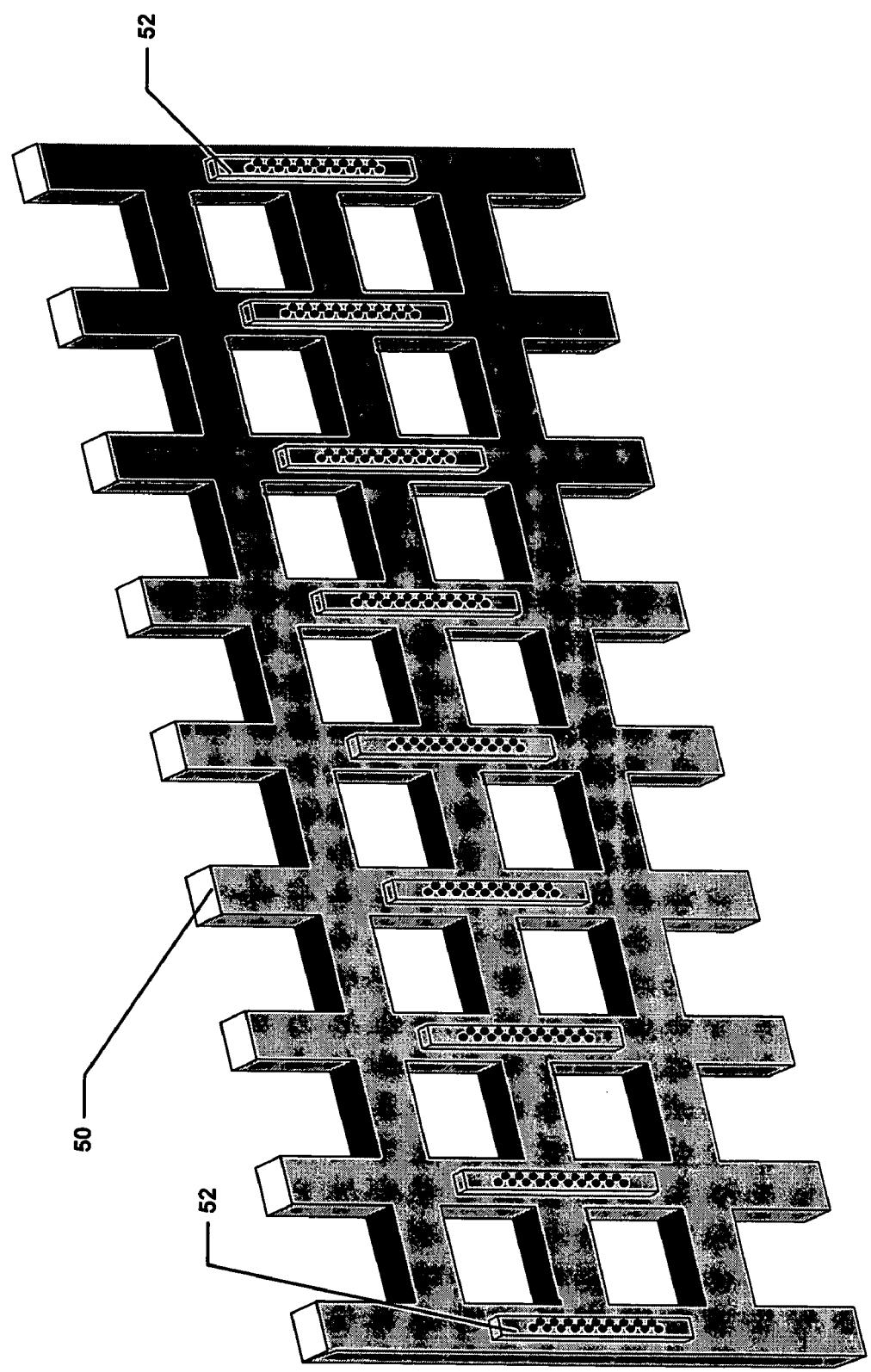
FIG. 4 shows a backplane with high volume airflow achieved by removing large portions of back-plane area while maintaining strength with a grid of heavy-gauge circuit board material.

In this scenario, as shown in FIG. 4, a special backplane 50 is used which provides for electrical interconnection of the chassis controller 30 and all blades 32a-32n and ports. Unlike conventional circuit boards, the back-plane 50 is constructed of relatively thick layers, so as to provide mechanical rigidity, and includes large holes cut out to provide for airflow. Connectors 52 on the back-plane 50 allow for PSE test blades 32a-32n and the chassis controller 30 to be plugged into the back-plane 50 for interconnection of these elements. Fans in an otherwise standard chassis rack would push air through the structure, and the holes through the backplane allow the air to flow freely through the structure. Heat sinks on the blades would experience free airflow for maximum heat exchange.

Figure 5:
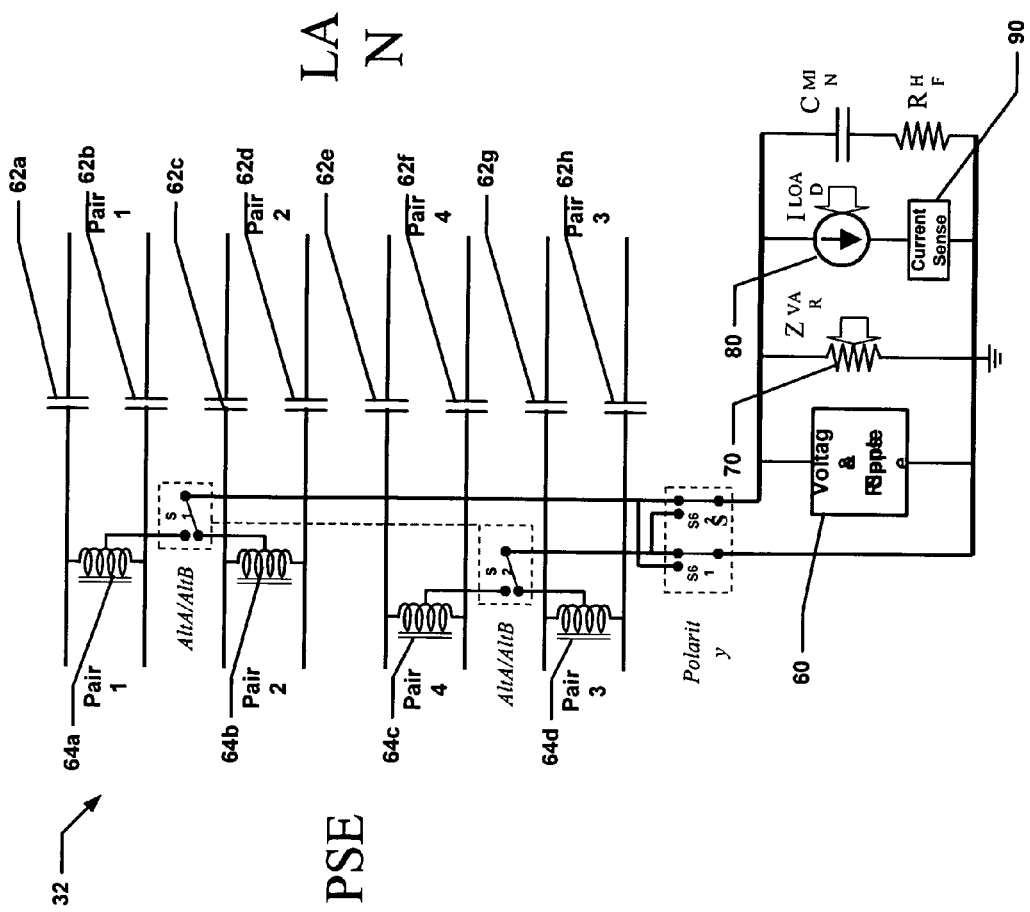
FIG. 5 shows a single-port PSE switching and test configuration which enables selection of Alternative A or B and polarity, separates the DC and Ethernet signals, and provides for voltage measurements and impedance and current loading of the PSE.

A particular embodiment of a line switching and instrumentation configuration of a PSE test blade 32 for testing a single PSE port is shown in FIG. 5. One or more such circuits could be designed to fit on a test blade. The PSE may be integrated into an Ethernet switch, or a midspan PSE may be inserted between the Ethernet switch and the PSE instrument; in either case, the PSE under test is connected at the PSE side of the diagram (the first network connection). If LAN testing is to be carried out concurrently with exercise of the PSE, then the data testing equipment is connected at the LAN side of the diagram (the second network connection). Blocking capacitors 62a-62h keep the DC voltage from the PSE from being transferred to equipment connected on the LAN side, but have negligible effect on Ethernet signals. Relay switches (s1 and s2) under control of the port controller provide for selection between Alternative A and Alternative B, and also polarity reversal between the PSE-powered pairs and the instrumentation elements, if necessary.

The DC and low-frequency signals associated with a PSE are separated from the Ethernet signals using a form of precision inductive voltage divider including inductors 64a-64d). Because the Ethernet signals are differential, they will produce no output to the sensing circuitry if the division ratio is precisely one-half. While in theory this voltage divider might have been implemented using two simple inductors, standard inductors are not produced with high-precision values. While the exact value of inductance is not critical, the suppression of the Ethernet signal getting to the measurement circuitry depends upon how closely the two inductors across a twisted pair match each other. One solution to this problem is to employ a bifilar-wound toroid. Multi-filar transformers are well-known to produce various RF transformer configurations wherein precise integer turns ratios are required. In this PSE-testing application, a bifilar configuration effectively provides two inductances (e.g. 64a and 64b or 64c and 64d) which match each other to a high degree, hence giving excellent suppression of the Ethernet signals from the instrumentation circuits.

A multiplicity of elements is also shown across the sensing bus in FIG. 5; measurement capability for DC voltage and voltage ripple 60, passive impedance loading 70, current loading 80. and current sensing 90, described in more detail below. Also shown is a series resistor-capacitor combination $C_{MIN}$ and $R_{HF}$. At low frequencies only $C_{MIN}$ has effect, and its value is selected to be consistent with the minimum capacitance specified for the PSE standard used (e.g., 802.3af). Of course, $C_{MIN}$ also keeps $R_{HF}$ from loading the sense bus at low frequencies. At high frequencies, for example, ripple frequencies corresponding to DC-to-DC chopping, only $R_{HF}$ has effect, and this combines with the magnetizing inductance of the sense inductors to roll-off the high-frequency response as desired.

Figure 6:
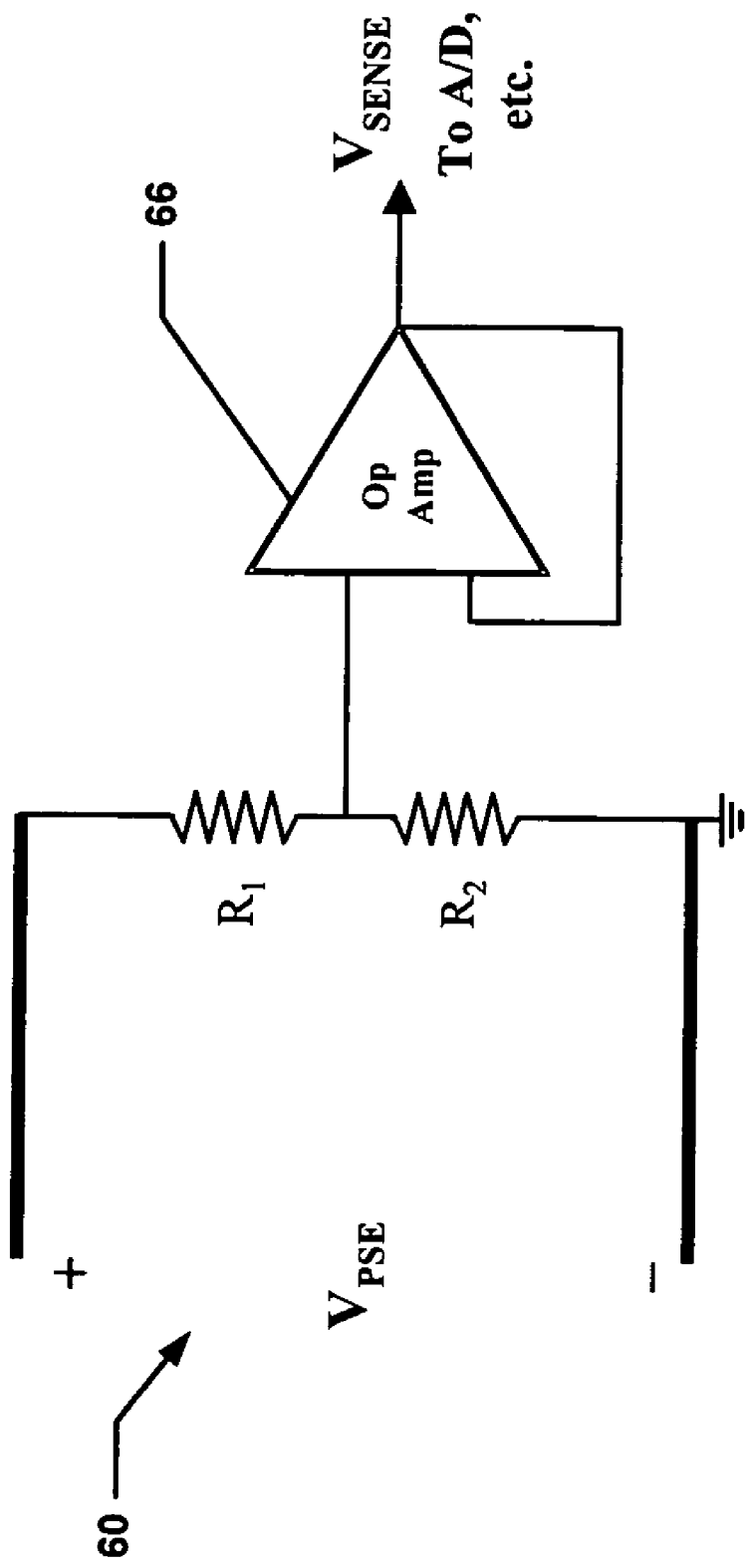
FIG. 6 shows DC voltage sensing using precision resistive voltage divider with a unity-gain operational amplifier for buffering.

FIG. 6 shows a particular embodiment of a circuit 60 for measuring DC voltage across the sensing bus. Precision resistors R1 and R2 form a voltage divider which scales the DC voltage to the range of the Analog-to-Digital Converter (ADC) used for measurements. A unity-gain buffer 66, using an operational amplifier having low off-set voltage, prevents loading of the resistor divider by the ADC. Because the resistors can be of very high precision, this scaling circuit maintains high accuracy in the DC voltage measurement.

Figure 7:
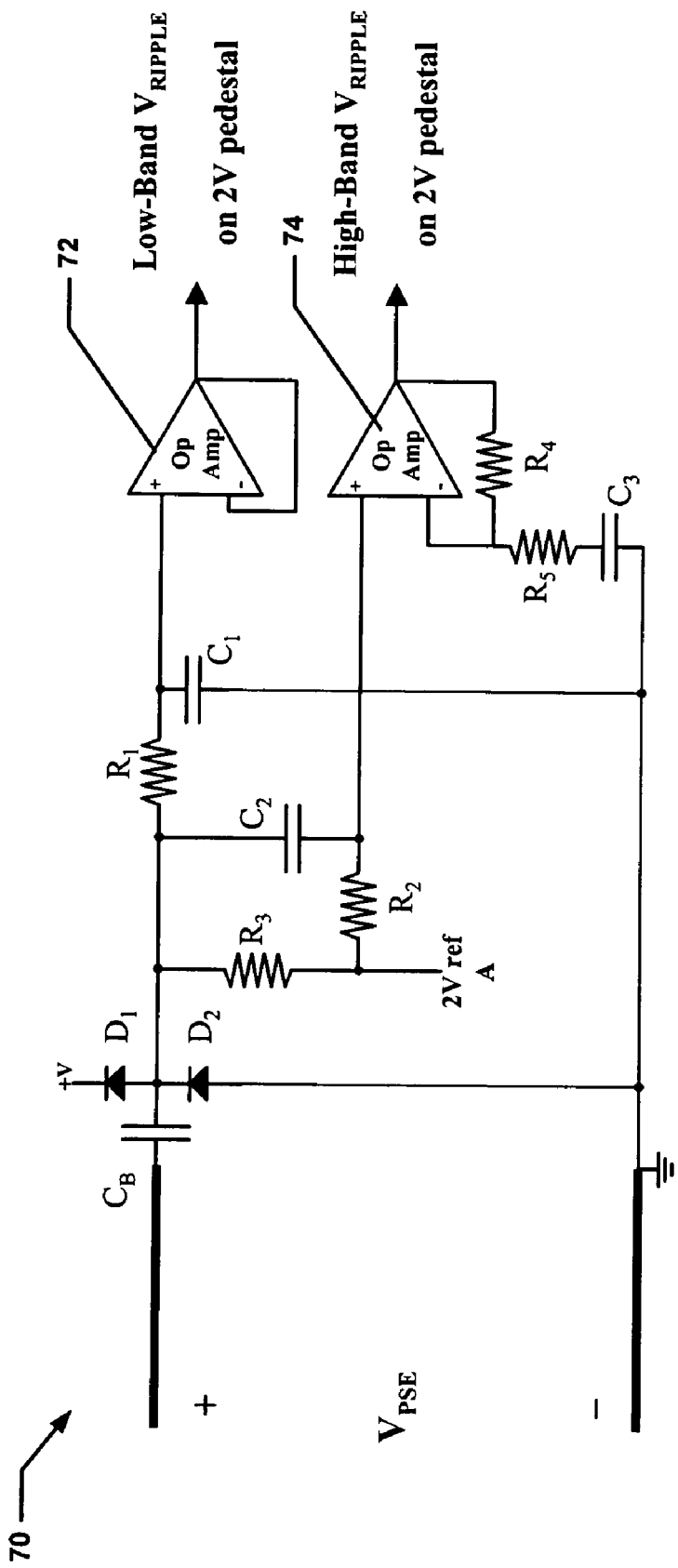
FIG. 7 depicts voltage ripple sensing in two frequency bands distinguishing ripple associated with 60 Hz and its harmonics from that due to DC-to-DC chopping frequencies.

To characterize the ripple component of the PSE voltage in detail, the AC component of the voltage on the sensing bus is sampled in the ADC and subjected to various forms of analysis in the processor, e.g., FFT to examine spectral content. However, a PSE test instrument need not perform such complex analysis. Ripple measurements in a particular embodiment can be conveniently performed in two frequency bands using a circuit 70 as shown in FIG. 7. This provides the ability to measure ripple at power frequencies, e.g., 50, 60 or 400 Hz, plus harmonics, and also to measure ripple produced by DC-to-DC converters used in PoE for DC isolation, e.g., 150 to 200 kHz. A blocking capacitor $C_B$ passes only the ripple component of voltage on the sensing bus. Because such a blocking capacitor $C_B$ functions as a differentiator, diodes $D_1$ and $D_2$ are used to clip transients generated by rising and falling edges of the DC waveform on the sensing bus, hence protecting the amplifiers in the ripple sensing circuitry. A pedestal voltage, here shown as 2V, can be applied from a low-impedance source such as a voltage-regulator diode and applied via resistors $R_2$ and $R_3$ to the positive terminals of the buffer amplifiers 72 and 74 for the two ripple bands; this produces a DC pedestal voltage on the two outputs so that the ADC employed can be unipolar.

In FIG. 7, resistor $R_1$ and capacitor $C_1$ form a low-pass filter to define the upper cut-off frequency of the lower ripple-measurement band. The lower cut-off frequency of this ripple band is determined by the blocking capacitor $C_B$ and $R_3$. Capacitor $C_2$ and resistor $R_2$ form a high-pass filter to define the lower cut-off frequency of the upper ripple band. The upper cut-off frequency of this ripple band is determined by $R_{HF}$ in FIG. 5. The buffer amplifier 72 for the lower ripple band can be a unity-gain operational amplifier configuration because the ripple amplitude in the lower band can be large due to the AC MPS "keep-alive" signal which might be present under 802.3af. The buffer amplifier 74 for the upper ripple band should have gain greater than one because the upper-band ripple is considerably smaller than that of the lower band. Resistors $R_4$ and $R_5$ set the gain of the buffer 74 for the upper band. Capacitor $C_3$ blocks DC for this amplifier so that the DC pedestal is passed through in unity-gain mode.

Normally a ripple-measurement circuit might include a peak-detector to quantify the ripple voltage. However, peak-detectors may be simple diode circuits, in which case there must be considerable amplification to drive the diodes, or they may employ operational amplifiers, in which case they become somewhat complex. To avoid the cost and/or complexity of peak-detector circuits, the output of the selected buffer amplifier in FIG. 7 is sampled in the ADC, and these samples may be analyzed to determine peak-to-peak or RMS ripple voltage, or both.

Figure 8:
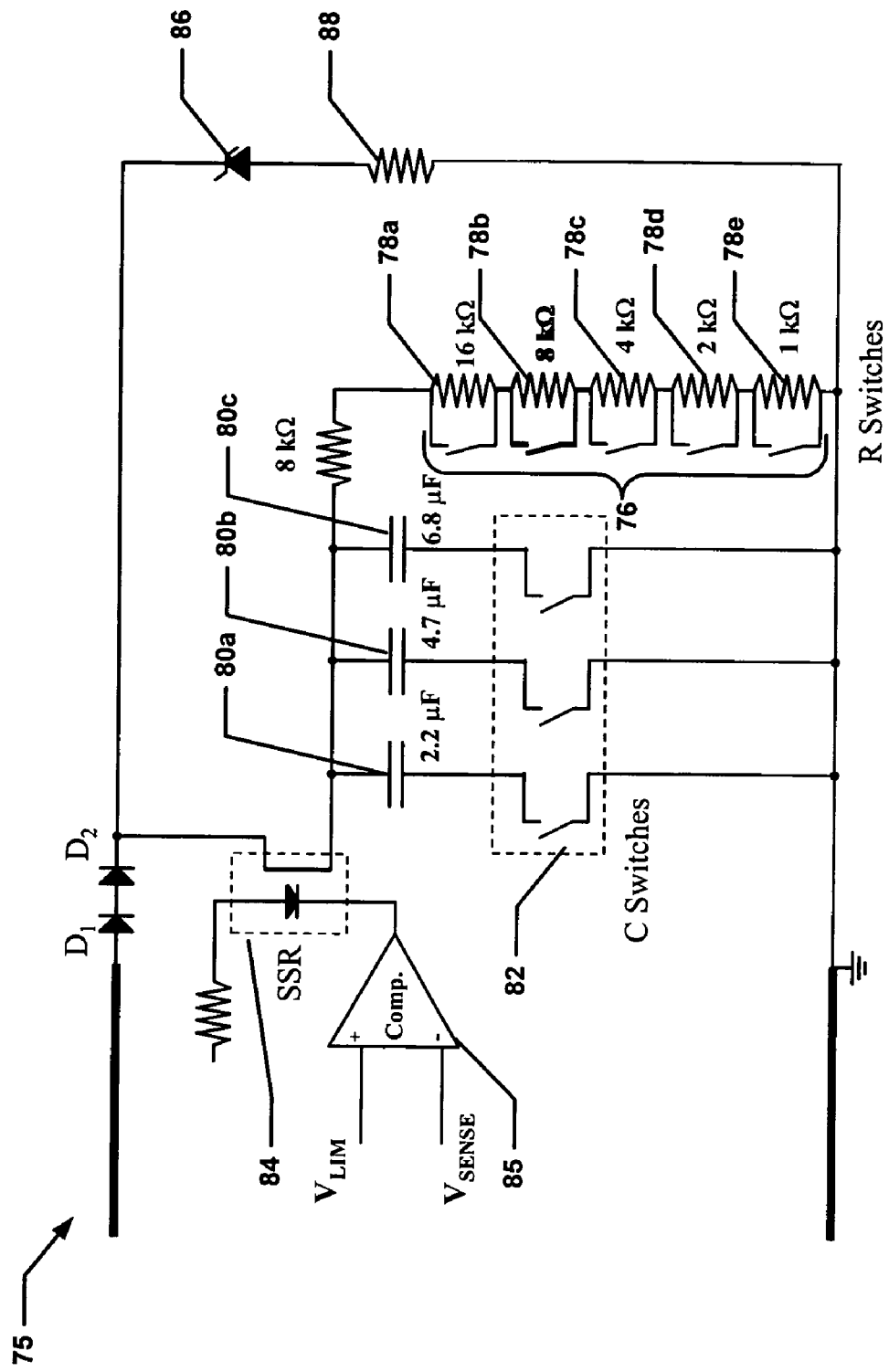
FIG. 8 shows a digitally controlled resistance and capacitance loads.

Passive impedance loading of a PSE can be exercised with the circuit 75 of FIG. 8. In a particular embodiment, for presenting varying detection resistance, a digital resistor is implemented using digitally controlled CMOS switches 76 to shunt resistors 78a-78e in a series configuration. An alternative is to employ available digital potentiometer ICs, however, these devices typically operate at lower voltages than handled using CMOS switches. As a preferred embodiment, for example, FIG. 8 shows an 8-kΩ fixed resistor 78b in series with 1-, 2-, 4-, 8- and 16-kΩ resistors 78a and 78c-e respectively which can be individually shunted by the R switches 76. This configuration yields a digital resistor which can reflect 8 through 39 kΩ in 1-kΩ steps. Generally, a full range of resistance could be implemented; however, for PSE testing the example shown is adequate because it spans the range of resistance of interest and saves cost. Of course, actual resistor values available in appropriate tolerance could be substituted for the nominal values shown. To conform to the 802.3af standard, diodes $D_1$ and $D_2$ are in series to reflect the bridge diode configuration required under that standard. These diodes also protect the passive load from voltage reversal. To exercise the capacitance presented to the PSE, a set of parallel capacitors may be switched digitally. For example, FIG. 8 shows three capacitors 80a-c, (2.2-, 4.7- and 6.8-μF), in parallel with C switches 82 connecting the capacitors to ground. It would be possible to implement a full range of digital capacitance, but as was the case of resistance, this set of capacitors bridges the range of interest for 802.3af.

The CMOS switches used to control the resistance and capacitance presented to the PSE typically can stand-off only moderate voltage. To address this issue, a Solid-State Relay (SSR) 84 is used to disconnect the digital resistor and capacitor from the sensing bus. A comparator 85 may be used, comparing the sensing voltage to a limit voltage, which would open a normally closed SSR 84. However, it is not possible to simply remove the passive load from the sensing bus, since the PoE AC MPS signal must detect the presence of a resistance within specified limits to keep a PSE from shutting down. Thus, FIG. 8 also shows a Zener diode 86 which becomes conducting at approximately the same PSE voltage at which the SSR 84 disconnects the digital impedances, thus switching in a non-critical resistance $R_{MPS}$ 88 required to keep a PSE active. This cross-over voltage, e.g., 10.5 V, must be selected to be higher than PSE voltage during detection classification modes, but below the 44V corresponding to a fully activated PSE.

Figure 9:
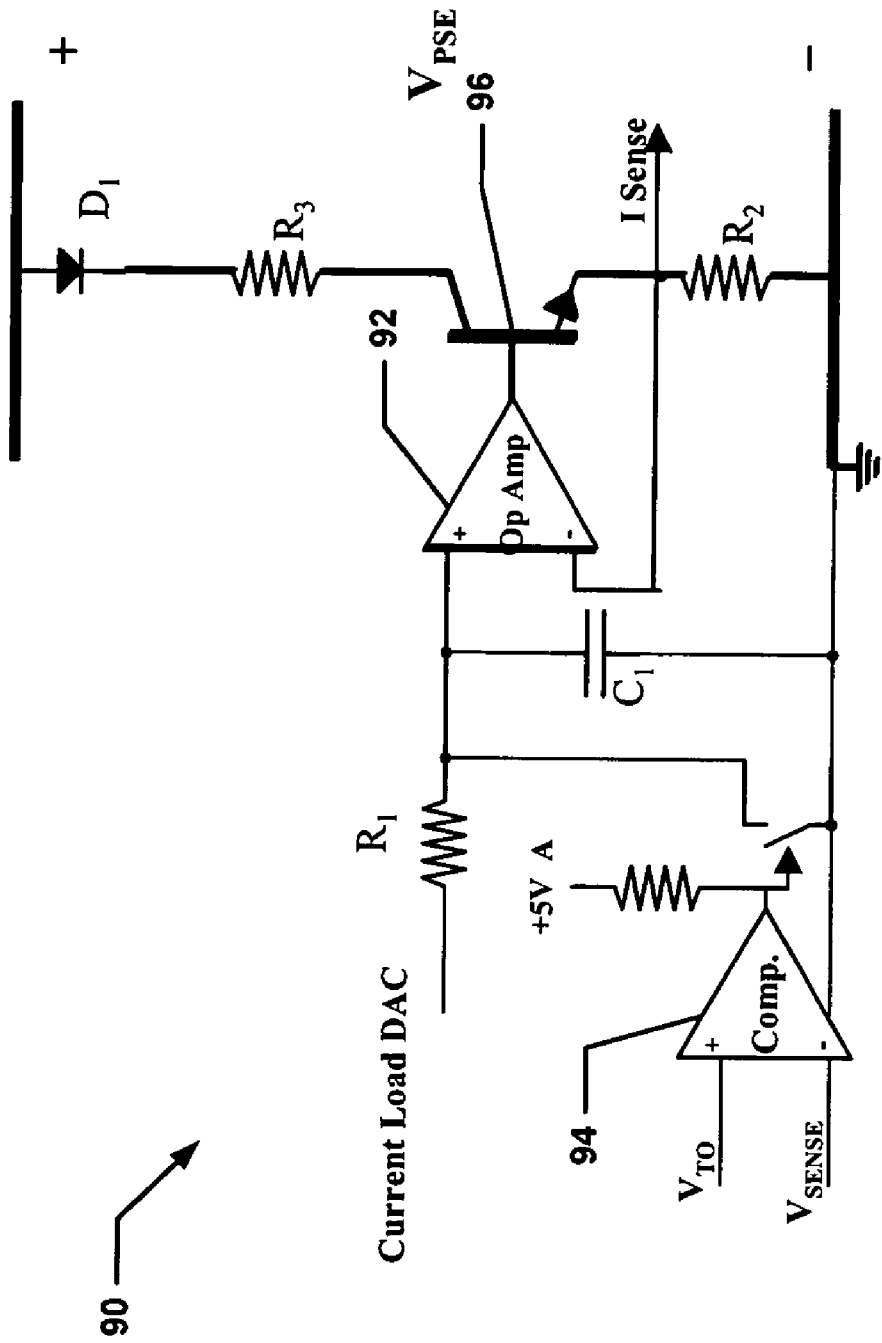
FIG. 9 shows a digitally controlled current load with current sense.

Current loading of a PSE may be effected in a particular embodiment with a circuit as shown in FIG. 9. This current loading circuit 90 is used to set the classification current during the optional PSE classification phase, and also is required to exercise the PSE in examining DC voltage and ripple behaviors vs. load current after the PSE is activated. The basic operation is setting a voltage from the Current Load DAC which is enforced by the operational amplifier 92 to be the voltage across the current-setting resistor $R_2$. The rise time of the DAC voltage delivered to the operational amplifier 92, hence the load current drawn, is controlled by the $R_1/C_1$ combination. Resistor R3 is designed to dissipate power which would otherwise be dissipated in the transistor 96 under worst-case conditions.

While the load current should normally closely follow that programmed by a port controller via the DAC, it is helpful to provide the voltage across the resistor R2 as a measurement. This primarily enables measurements of required load current limiting behaviors by the PSE where actual load current will be less than programmed load current. If a transient current load is programmed by the processor, it is useful to provide for recording this along with other parameters. In addition, for highest accuracy, the measurement of current provided by the current-sense voltage is fundamentally better than the setting of the current because fewer components are involved in the measurement than the setting. This also can provide a trigger mechanism which may be exploited by the port controller.

Because PoE detection, for which there is no current other than drawn by the detection resistance, must occur before classification, and because the transition from detection to classification may proceed on a time scale which prohibits intervention by the port controller, the current load should not actually draw current from the PSE until the PSE voltage exceeds that relevant to detection. A comparator 94 is used to deprive the operational amplifier of the DAC voltage when the sense voltage $V_{SENSE}$ is lower than some turn-on voltage $V_{TO}$ by shorting the DAC voltage using, for example, a CMOS switch.

Figure 10:
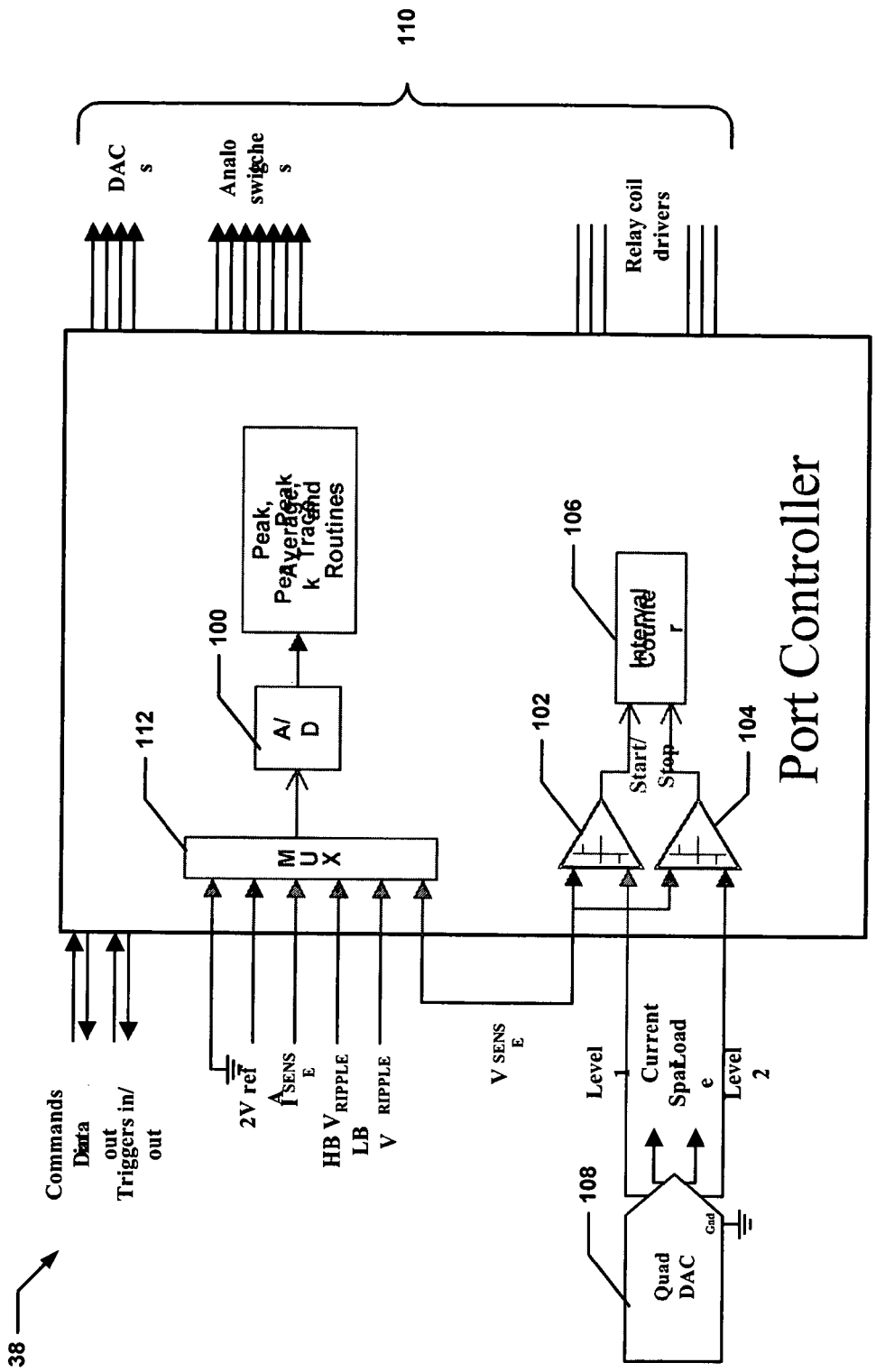
FIG. 10 depicts a port controller used for port control and interface.

One aspect of instrumentation design is the performance of as many tasks in the port controller as possible, thus minimizing component cost and maximizing flexibility. While generally the port processor might be implemented using devices ranging from Field Programmable Logic Arrays (FPGA) to micro-processors, micro-controllers available from industry provide a unique match to the requirements of PSE testing. While slower than FPGAs, micro-controllers are fast enough for PSE testing. While limited in computation capacity compared to micro-processors, micro-controllers have adequate computation capacity for PSE testing. However, unlike FPGAs or micro-processors, typical micro-controllers offer integrated circuit elements not normally available from FPGAs or micro-processors. FIG. 10 shows an example of a port controller 38 using an industry-standard micro-controller which incorporates a measurement Analog-to-Digital Converter (ADC) 100, as well as comparators 102 and 104 and a timer 106 which can be set to measure intervals between external events. The timer 106 could also enable the port controller 38 to control the time between events, or to measure times between other events, for example trigger signals sent to the port controller. These components could also be instantiated external to the processor, but available micro-controllers with these components included on-chip provide considerable cost savings. FIG. 10 shows the addition of a four-output Digital-to-Analog Converter (quad DAC) 108 providing various reference voltages; this DAC 108 might also be available internally in some micro-controllers.

In particular embodiments, at least one of the current loading circuit, the resistance loading circuit, the capacitance loading circuit, and the load current and voltage measuring circuit utilizes trigger signals to effect sequences derived from at least one of changes in port configuration, changes in current loading, voltage transitions, remote software generated signals delivered over a chassis trigger bus, and events occurring on other ports delivered over the chassis trigger bus.

The port controller 38 has outputs 110 which control the port-switching relays, the DACs and the various CMOS analog switches (for control of passive resistance and capacitance loading, as well as miscellaneous functions). The port controller ADC can be used with signal-processing routines to perform parameter measurements, such as average and peak-to-peak voltage, and peak-to-peak and RMS ripple voltage. In addition, the port controller can record a transient (trace) of PSE voltage or current; this is important for PSE measurements because the 802.3af standard allows considerable variability in the start-up behavior of PSEs. Without a trace capability, many PSE measurements might take a very long time, or might be impossible to perform accurately.

To the degree possible, measuring internal parameters enables calibration routines to mitigate the need for periodic calibration of the instrument. Therefore, FIG. 10 shows various parameters being introduced to the measurement ADC using a multiplexer 112, for example shown as internal to the port controller. Bringing the ground into the multiplexer enables determination of the offset voltage of the ADC used for all other measurements. Bringing in the pedestal voltage, i.e., "2V ref" in the example shown, enables internal calibration of the ripple measurements, although peak-to-peak measurements can be effected without such calibration. The port controller 38 utilizes a set of test primitives which are accessed in real time via a user interface to execute test sequences for characterizing PSE devices.

Having described preferred embodiments of the invention it will now become apparent to those of ordinary skill in the art that other embodiments incorporating these concepts may be used. Accordingly, it is submitted that that the invention should not be limited to the described embodiments but rather should be limited only by the spirit and scope of the appended claims.

What is claimed is:

1. An apparatus for measuring characteristics of at least one Power Over Ethernet (POE) Power Sourcing Equipment (PSE) device, the apparatus comprising:
   a port controller;
   a programmable current loading circuit in communication with said port controller;

a programmable resistance loading circuit in communication with said port controller;

a programmable capacitance loading circuit in communication with said port controller;

a load current measuring circuit in communication with said port controller;

a voltage measuring circuit in communication with said port controller; and an input network connection capable of receiving power signals from a network and providing said power signals to at least one of said current loading circuit, said resistance loading circuit, said capacitance loading circuit, and said load current and voltage measuring circuit and wherein said port controller utilizes a set of test primitives which are accessed interactively in real time via a user connection to execute test sequences for characterizing PSE devices, and wherein said characterizing comprises measuring signaling protocols, signal levels, signal timing parameters, loading thresholds, and load limiting behaviors to ensure they are in compliance with IEEE 802.3 Clause 33 specification.

2. The apparatus of claim 1 wherein said port controller, said current loading circuit, said resistance loading circuit, said capacitance loading circuit, said load current measuring circuit, and said voltage measuring circuit are provided with isolated D.C. power such that D.C. isolation is achieved between said input network connection and other entities including D.C. power and user connection facilities that may be required to power and control the apparatus.

3. The apparatus of claim 1 further comprising timing trigger primitives for generation of trigger signals that are time coincident to events, and timing measurement circuits for measuring times between the events, wherein said events include at least one of the group consisting of signaling and power state transitions from a PSE, internal state transitions in the apparatus required to stimulate specified behavioral responses by a PSE, electrical trigger signals received by the port controller, and user commands directed to the port controller.

4. The apparatus of claim 3 wherein at least one of said current loading circuit, said resistance loading circuit, said capacitance loading circuit, said load current measuring circuit, and said voltage measuring circuit utilizes said trigger signals to effect changes in resistance and capacitance loading, changes in current loading, voltage measurements of varying time aperture, current measurements of varying time aperture, time interval measurements, and D.C. isolated electrical trigger signals.

5. The apparatus of claim 4 further comprising a transient load control and response measurement circuit in communication with said input network connection to sequence one or more levels and durations of load current that are time-synchronized to said trigger signals that may coincidentally trigger voltage measurements, current measurements, and time interval measurements.

6. The apparatus of claim 1 further comprising an output network connection coupled to the input network connection in such a manner as to allow non-POE compatible packet transmission test equipment outside the apparatus to communicate with a PSE connected to said input network connection, wherein said output network connection is D.C. isolated from the apparatus of claim 1 and is also D.C. isolated from the input network connection, and wherein this isolation enables the apparatus to pass through network traffic while terminating and manipulating the Power-over-Ethernet load to the PSE.

7. The apparatus of claim 1 further comprising a peak-to-peak voltage ripple measurement circuit in communication with said input network connection.

8. The apparatus of claim 7 wherein said peak-to-peak voltage ripple measurement circuit includes a low frequency voltage ripple measurement circuit and a high frequency voltage ripple measurement circuit.

9. A system for measuring characteristics of a plurality of Power Over Ethernet (POE) Power Sourcing Equipment (PSE) devices, the system comprising:

a chassis power supply;

a chassis trigger bus;

a chassis controller; and at least one POE PSE test and measurement device in communication with said chassis controller, each of said POE PSE test and measurement devices comprising:

a port controller;

a programmable current loading circuit in communication with said port controller;

a programmable resistance loading circuit in communication with said port controller;

a programmable capacitance loading circuit in communication with said port controller;

a load current measuring circuit in communication with said port controller;

a voltage measuring circuit in communication with said port controller; and an input network connection capable of receiving power signals from a network and coupling said power signals to at least one of said current loading circuit, said resistance loading circuit, said capacitance loading circuit, said voltage measuring circuit, and said load current measuring circuit and wherein said port controller utilizes a set of test primitives which are accessed interactively in real time via a user interface to execute test sequences for characterizing PSE devices, and wherein said characterizing comprises measuring signaling protocols, signal levels, signal timing parameters, loading thresholds, and load limiting behaviors to ensure they are in compliance with IEEE 802.3 Clause 33 specification.

10. The system of claim 9 wherein said chassis controller further comprises a network interface capable of communicating with other computers.

11. The system of claim 9 wherein each POE PSE test and measurement device is provided with isolated D.C. power such that D.C. isolation is achieved between each POE PSE test and measurement device and said chassis power supply, and between each and every POE PSE test and measurement device in the system.

12. The system of claim 9 each POE PSE test and measurement device is provided with isolated data and trigger signals such that D.C. isolation is achieved between each POE PSE test and measurement device and said chassis controller, and between each POE PSE test and said chassis trigger bus.

13. The system of claim 9 wherein each of said POE PSE test and measurement devices include timing trigger primitives for generation of trigger signals that are time coincident to events, and timing measurement circuits for measuring times between the events, and wherein said events include at least one of signaling and power state transitions from a PSE, internal state transitions in the apparatus required to stimulate specified behavioral responses by a PSE, electrical trigger signals received by the port controller, and user commands directed to the port controller.

14. The system of claim 13 wherein each of said POE PSE test and measurement devices include at least one of said current loading circuit, said resistance loading circuit, said voltage measuring circuit, said capacitance loading circuit, said load current measuring circuit, and said voltage measuring circuit utilizes said trigger signals to effect changes in resistance and capacitance loading, changes in current loading, voltage measurements of varying time aperture, current measurements of varying time aperture, time interval measurements, and D.C. isolated electrical trigger signals.

15. The system of claim 14 wherein each of said POE PSE test and measurement devices include a transient load control and response measurement circuit in communication with said input network connection to sequence one or more levels and durations of load current that are time-synchronized to said trigger signals that may coincidentally trigger voltage measurements, current measurements, and time interval measurements.

16. The system of claim 9 wherein each of said POE PSE test and measurement devices include an output network connection in coupled to an input network connection in such a manner as to allow non-POE compatible packet transmission test equipment outside the system to communicate with a PSE connected to said input network connection, wherein said output network connection is D.C. isolated from said input network connection and is also D.C. isolated from said chassis power supply, said chassis controller, said chassis trigger bus, and each and every other POE PSE test and measurement device in the system, and wherein said isolation enables each POE PSE test and measurement device to pass through network traffic while terminating and manipulating the Power-over-Ethernet load to the PSE.

17. The system claim 9 wherein each of said POE PSE test and measurement devices include a voltage ripple measurement circuit in communication with said input network connection.

18. The system of claim 17 wherein said voltage ripple measurement circuit includes a low frequency voltage ripple measurement circuit and a high frequency voltage ripple measurement circuit.

\* \* \* \* \*

UNITED STATES PATENT AND TRADEMARK OFFICE
CERTIFICATE OF CORRECTION

PATENT NO. : 7,627,398 B1            Page 1 of 1
APPLICATION NO. : 11/355783
DATED : December 1, 2009
INVENTOR(S) : Bennett et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 568 days.

Signed and Sealed this

Second Day of November, 2010

David J. Kappos
*Director of the United States Patent and Trademark Office*